US008019302B2

(12) United States Patent
Hu et al.

(10) Patent No.: US 8,019,302 B2
(45) Date of Patent: Sep. 13, 2011

(54) INTEGRATED AIR LOOP ANTENNA AND TRANSFORMER ANTENNA ASSEMBLY

(75) Inventors: Zhiqi Hu, Guangdong (CN); Ligang Zhang, Guangdong (CN); Chengzhou Lin, Guangdong (CN)

(73) Assignee: Silicon Laboratories Inc., Austin, TX (US)

( * ) Notice: Subject to any disclaimer, the term of this patent is extended or adjusted under 35 U.S.C. 154(b) by 502 days.

(21) Appl. No.: 12/313,087

(22) Filed: Nov. 17, 2008

(65) Prior Publication Data

US 2010/0124883 A1 May 20, 2010

(51) Int. Cl.
*H04B 1/18* (2006.01)

(52) U.S. Cl. ........................................ 455/274; 455/269

(58) Field of Classification Search ........................ None
See application file for complete search history.

(56) References Cited

U.S. PATENT DOCUMENTS

| | | | | |
|---|---|---|---|---|
| 3,918,062 | A | 11/1975 | Haruki et al. | 343/702 |
| 4,208,663 | A | 6/1980 | Ogita | 343/853 |
| 4,278,980 | A | 7/1981 | Ogita et al. | 343/748 |
| 4,369,446 | A | 1/1983 | Takayama | 343/711 |
| 6,366,247 | B1 | 4/2002 | Sawamura et al. | 343/702 |
| 6,711,385 | B1 | 3/2004 | Abraham | 455/80 |
| 7,200,375 | B2 * | 4/2007 | Kottschlag et al. | 455/272 |
| 7,573,349 | B2 | 8/2009 | Rauch | 333/26 |
| 7,813,708 | B2 * | 10/2010 | Inaba et al. | 455/193.1 |
| 2008/0013443 | A1 | 1/2008 | Lane et al. | 370/203 |

* cited by examiner

*Primary Examiner* — An Luu
(74) *Attorney, Agent, or Firm* — O'Keefe, Egan, Peterman & Enders, LLP

(57) ABSTRACT

Systems and methods are disclosed for an integrated air loop antenna and transformer antenna assembly that provides improved performance in receiving RF signals and AM broadcast channels, in particular. In one embodiment, an air loop antenna is coupled to a transformer to form an integrated antenna assembly. This integrated air loop antenna and transformer antenna assembly can then be connected to a radio device having antenna connections.

20 Claims, 3 Drawing Sheets

INTEGRATED AIR LOOP ANTENNA AND TRANSFORMER ANTENNA ASSEMBLY

TECHNICAL FIELD OF THE INVENTION

This invention relates to radio frequency communications and, more particularly, to radio frequency receive operations in devices.

BACKGROUND

Portable devices exist that provide radio frequency (RF) receiver functionality including RF receiver functionality in the AM broadcast band (about 520 to 1710 KHz). These prior radio devices have used receive antennas to receive broadcast channels. In particular, prior AM radio receiver systems have used air loop antennas to receive AM broadcast channels. These AM air loop antennas have been widely used in desktop radio applications, miniature high fidelity systems, home theater systems, etc. The air loop antennas are typically located away from the radio circuitry itself to make the air loop antenna much less susceptible to noise sources commonly caused by the other electronics associated with the radio device. In addition, the orientation of the external air loop antenna is independent of the placement of the radio device.

The AM air loop antenna has a small inductance, and the common practice is to insert a transformer between the air loop antenna and the radio circuitry for impedance transformation and matching. The transformer acts to increase the inductance and reduce the capacitance as well as increase the magnetically coupled voltage signal seen by the radio device from the air loop antenna. Traditionally, the transformer is completely separated from the air loop antenna and is mounted on a printed circuit board (PCB) along with the radio receiver circuitry.

FIG. 1 (prior art) is a diagram for a traditional solution 100 for a radio device 120 having an air loop antenna 114 and an internal transformer 104. As depicted, a PCB 106 includes a radio integrated circuit (IC) 102 that is mounted to or positioned on the PCB 106. The radio IC 102 includes tuner circuitry for receiving and tuning broadcast channels, such as broadcast channels in the AM band (about 520 to 1710 KHz). In addition, a transformer 104 is coupled to the PCB 106. The antenna receive signal connections 110 from the radio IC 102 are coupled to transformer 104, and the antenna receive signal connections 108 from transformer are coupled to external antenna connection points 118A and 118B. The antenna connections 112 for the air loop antenna 114 then connect to the antenna connection points 118A and 118B. In operation, the performance of the air loop antenna 114 is improved by the transformer 104. It is noted that the air loop antenna 114 is configured and used for reception of broadcast channels and AM band broadcast channels in particular.

The traditional solution, however, has a number of disadvantages. The transformer takes up space on the PCB and increases the size required for the PCB thereby increasing the size of the radio device. Further, due to the close proximity of the transformer to the radio IC and other radio electronics on the PCB, the transformer tends to pick up noise thereby degrading radio performance. A typical solution to this interference problem is to heavily shield the transformer and/or place the transformer on the PCB at a further distance from the noise sources on the PCB. This solution, however, further causes increases in the size of the PCB which in turn causes increases in the size of the radio device. In addition, electromagnetic shielding in the AM frequency band can be challenging without a lot of BOM (build of materials) increases.

SUMMARY OF THE INVENTION

Systems and methods are disclosed for an integrated air loop antenna and transformer antenna assembly that provides improved performance in receiving RF signals and AM broadcast channels, in particular. In one embodiment, an air loop antenna is coupled to a transformer to form an integrated antenna assembly. This integrated air loop antenna and transformer antenna assembly can then be connected to a radio device having antenna connections. Other features and variations could also be implemented, as desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Systems and methods are disclosed for an integrated air loop antenna and transformer antenna assembly that provides improved performance in receiving radio frequency (RF) signals and AM band broadcast channels, in particular.

The disclosed embodiments solve problems associated with prior solutions by moving the transformer from the printed circuit board (PCB) to an integrated antenna assembly with the air loop antenna itself. As described above, an external air loop antenna is typically connected to the internal transformer with a shielded cable and/or twisted pair wiring. By placing the transformer external to the device according to the disclosed embodiments, the transformer can be removed from the PCB and integrated into an antenna assembly with the air loop antenna. By removing the transformer from the PCB, the PCB can be made smaller thereby allowing the radio device to be smaller. Further, noise picked up by the transformer from radio electronics on the PCB and within the device is reduced thereby improving performance of the radio device in tuning channels. Preferably, the transformer is not located too far away from contact points such that the parasitic capacitance of the wires from the transformer to the contact points becomes so great as to degrade the performance of the tuner on the radio integrated circuit (IC). For example, placing the transformer about 10 cm to 20 cm from the PCB contact points and/or the device antenna connection points along the antenna connector (e.g., shielded cable and/or twisted pair wiring) to the air loop antenna has been found to work well for performance of the radio IC.

Figure 2:
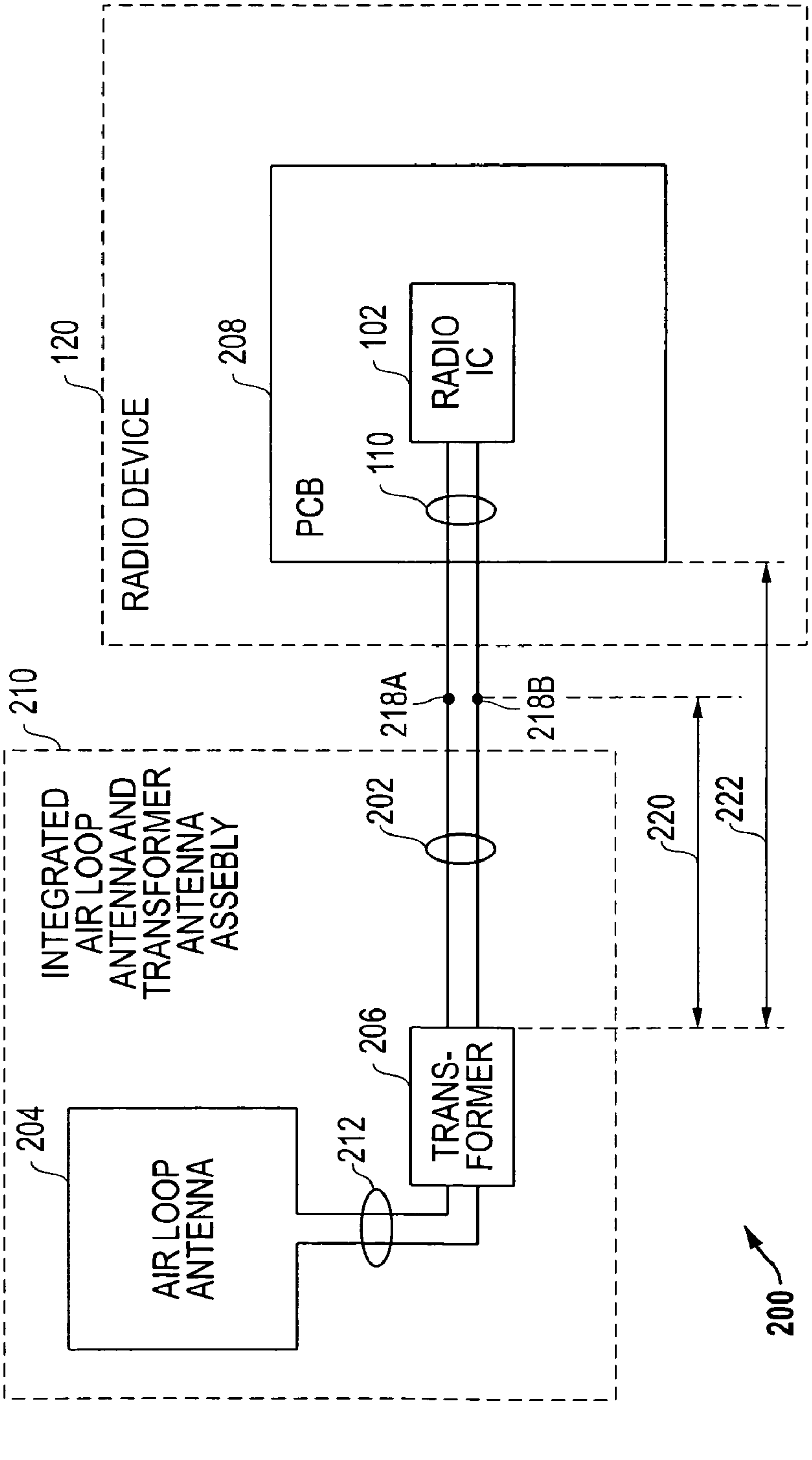
FIG. 2 is a diagram for an integrated air loop antenna and transformer antenna assembly that improves performance for the radio device.

FIG. 2 is a diagram for an embodiment 200 including an antenna assembly 210 having an air loop antenna 204 and an integrated transformer 206. As depicted, a printed circuit board (PCB) 208 includes a radio integrated circuit (IC) 102 coupled thereon. The PCB 208 is located within a radio device 120 that can be configured to output audio signals demodulated from radio signals received and tuned by the radio IC 102. The antenna receive signal connections 110 from the radio IC 102 are coupled to external antenna connection points 218A and 218B. The antenna connections 202 for the antenna assembly 210 are also connected to the antenna connection points 218A and 218B. The connections from the air loop antenna 204 are coupled to the transformer 206, and the output of the transformer provides the connections 202. In operation, the performance of the air loop antenna 204 is improved by the transformer 206. It is noted that the air loop antenna 204 is configured and used for reception of broadcast channels and AM band broadcast channels in particular. It is also noted that the air loop antenna 204 can be implemented with one or more wire loops to form the air loop antenna.

Figure 1:
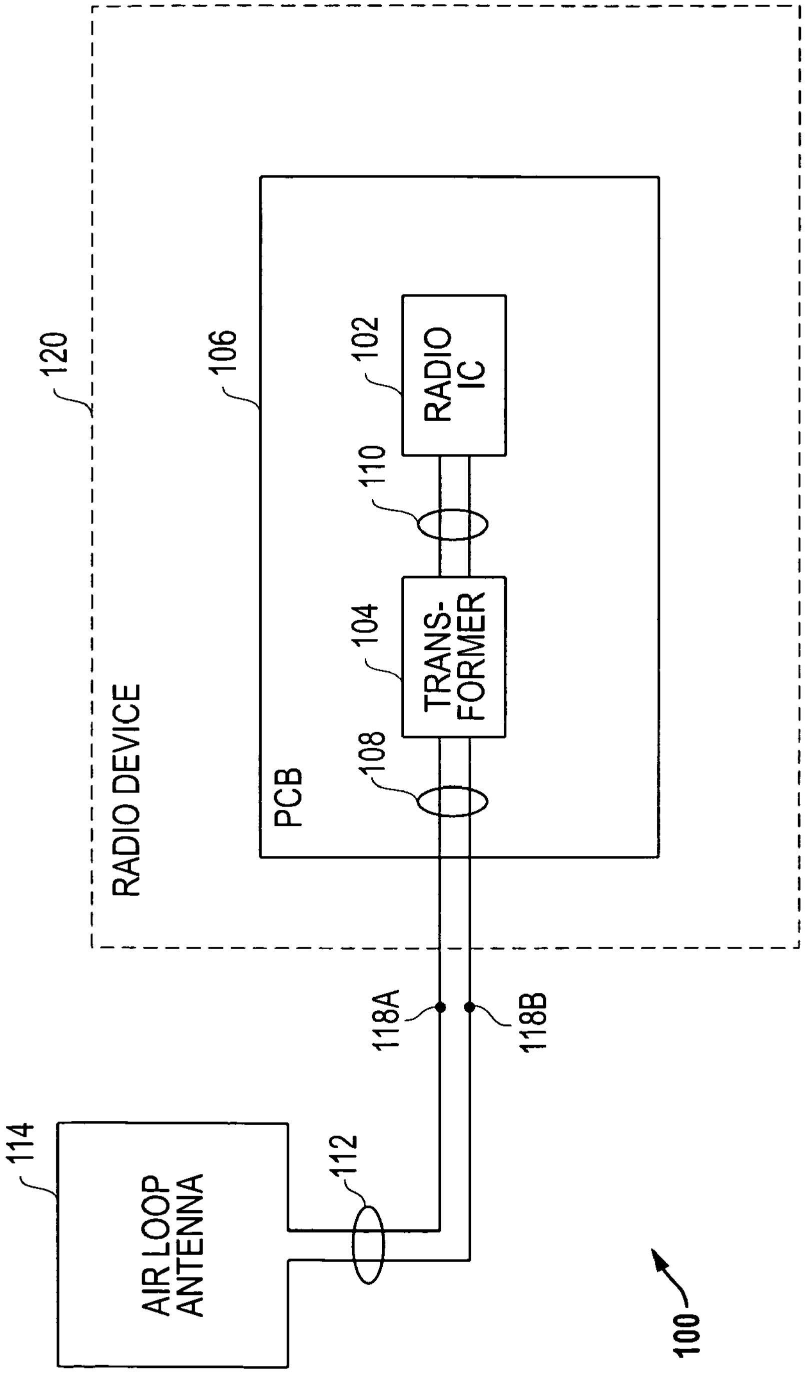
FIG. 1 (Prior Art)
FIG. 1 (prior art) is a diagram for a traditional solution having an external air loop antenna and a radio device with an internal transformer and radio integrated circuit (IC) on a printed circuit board (PCB).

In contrast with the prior solution of FIG. 1, the embodiment 200 of FIG. 2 provides an integrated antenna assembly 210 that includes the transformer 206 and the air loop antenna 204. By moving the transformer 204 external to the PCB 208 and the radio device 120, the performance of the air loop antenna 204 in conjunction with the radio IC 102 is improved. It is further noted that the transformer 206 is preferably positioned from 10 cm to 20 cm from the PCB 208 on which the radio IC 102 is mounted as represented by arrow 220 in FIG. 2. This distance has been found to yield optimal performance of the integrated antenna assembly 210 in conjunction with the radio IC 102. Alternatively, it is noted that the transformer 206 can be located from 10 cm to 20 cm from the external device connections 218A and 218B of the radio device 120 as represented by arrow 222 in FIG. 2. Further, it is noted that the 10 cm to 20 cm distance can be provided by having an antenna connector between the transformer 206 and the external device connections 218A and 218B be from about 10 cm to 20 cm in length. As stated above, the antenna connector can be implemented as a shielded cable, twisted pair wiring and/or any other desired signal transfer mechanism.

It is further noted that for many applications, the radio device 120 is normally enclosed in a case, likely a metal case, which will act as a shield for the transformer 206 integrated in the air loop antenna assembly 210 from the noise sources on PCB 208.

The integrated air loop antenna and transformer assembly described herein allows for air loop antenna applications in smaller devices that have AM functions. Traditionally, a transformer has been prohibitively large to fit in small devices, such as MP3 players, cell phones and/or other devices where a reduced size is desired. By removing the transformer out from the device and having it integrated with the air loop antenna, it is possible to have these small devices include AM functionality by including a simple two-point AM antenna connection. In this way, these devices can then be used as good radio devices for AM reception with the integrated air loop antenna and transformer assembly plugged into the device. With prior solutions, AM functionality was deemed undesirable due to the space required to house the transformer within the device.

Figure 3A:
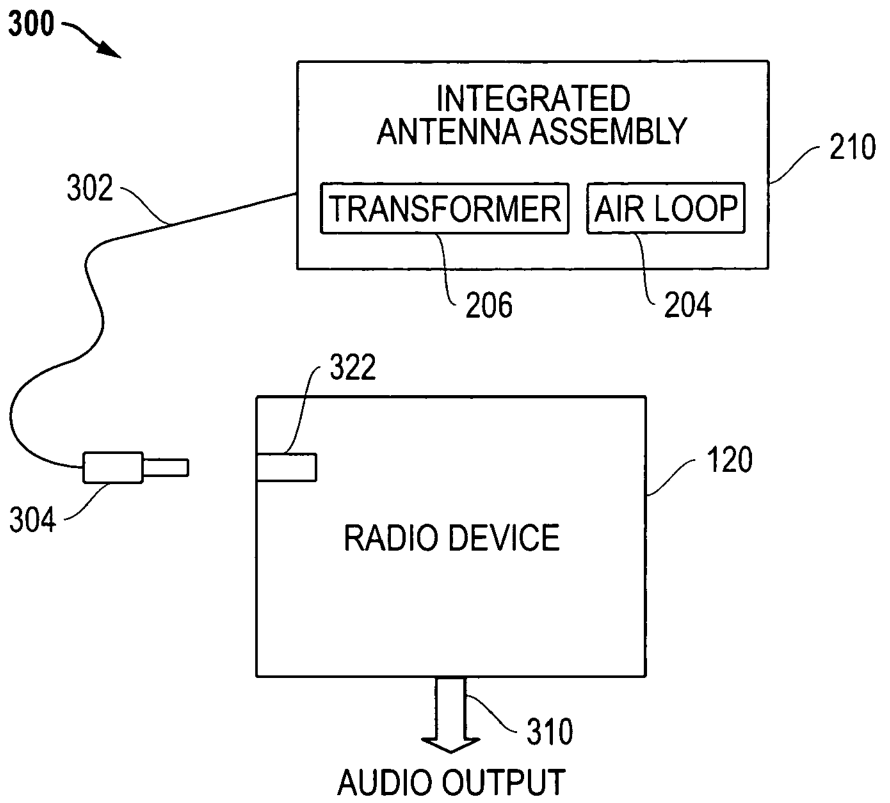
FIG. 3A is a block diagram for a radio system including a radio device and an integrated antenna assembly as described herein.

FIG. 3A is a block diagram for a radio system 300 including a radio device 120 and an integrated antenna assembly 210. As described herein, the integrated antenna assembly 210 includes an air loop antenna 204 and a transformer 206. The integrated antenna assembly 210 has an antenna connector 302 that extends from the integrated antenna assembly 210 to the radio device 120. The antenna connector 302 has connection 304 that couples to connection 322 on the radio device 120. The radio device 120 can be further configured to provide audio output 310 in a desired format, such as digital and/or analog audio information. For example, the audio output 310 can be an output for headphones or speakers, as desired.

More generally, the integrated antenna assemblies described herein can be used to address AM reception for any desired application where there is strong close-by AM interference. For example, in addition to the devices discussed above, the integrated antenna assemblies can also be used with USB (Universal Serial Bus) radio devices, which are devices that have AM radio circuitry and USB connectors for insertion into USB ports associated with electronic devices. USB radio devices are often plugged into personal computers that are well known for their strong interference to the reception of channels within AM broadcast bands. The integrated antenna assemblies described herein make it possible to build a small, flash-drive size USB AM/FM radio with an air loop and transformer assembly interface. The user can then attach the integrated air loop antenna and transformer assembly to the USB device if AM reception is desired for the electronic device to which the USB connector is connected.

Figure 3B:
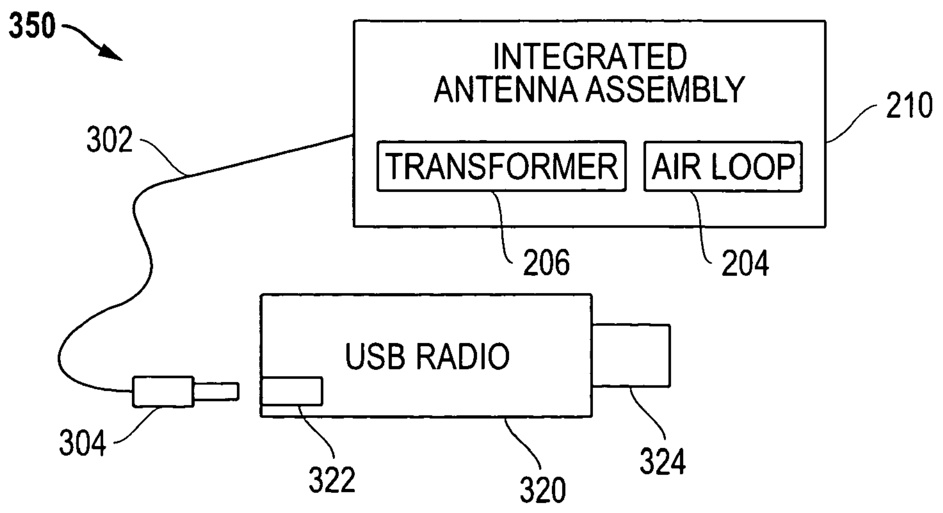
FIG. 3B is a block diagram for a radio system including a USB (Universal Serial Bus) radio and an integrated antenna assembly as described herein.

FIG. 3B is a block diagram for a radio system 350 including a USB (Universal Serial Bus) radio 320 and an integrated antenna assembly 210. Again, the integrated antenna assembly 210 includes an air loop antenna 204 and a transformer 206. The integrated antenna assembly 210 has an antenna connector 302 that extends from the integrated antenna assembly 210 to the USB radio 320, and the antenna connector 302 has connection 304 that couples to connection 322 on the radio device 120. The USB radio 320 can also have a USB connector 324 that can be coupled to a USB port on another device, such as a USB port associated with a personal computer. The device to which the USB radio 320 is connected can be further configured to provide an audio output in a desired format, such as digital and/or analog audio information.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A radio system including an integrated antenna assembly, comprising:

a radio device, the radio device comprising:

external antenna connections;

a printed circuit board positioned within the radio device; and a radio integrated circuit mounted on the printed circuit board and including tuner circuitry, the tuner circuitry having inputs coupled to the external antenna connections; and an external integrated antenna assembly, the integrated antenna assembly comprising:
an air loop antenna;
a transformer coupled to the air loop antenna; and
an antenna connector coupled to the transformer and to the external device connections of the radio device.

2. The radio system of claim 1, further wherein the transformer is configured to be positioned from 10 cm to 20 cm from the printed circuit board.

3. The radio system of claim 2, wherein the air loop antenna is configured to receive AM channels within an AM band between 520 KHz and 1710 KHz and the radio integrated circuit is configured to tune the AM channels.

4. The radio system of claim 1, further wherein the transformer is configured to be positioned from 10 cm to 20 cm from the radio device.

5. The radio system of claim 4, wherein the air loop antenna is configured to receive AM channels within an AM band between 520 KHz and 1710 KHz and the radio integrated circuit is configured to tune the AM channels.

6. The radio system of claim 1, wherein the antenna connector comprises a shielded cable.

7. The radio system of claim 1, wherein the antenna connector comprises twisted pair wiring.

8. The radio system of claim 1, wherein the air loop antenna comprises multiple wire loops.

9. The radio system of claim 1, wherein the air loop antenna is configured to receive AM channels within an AM band between 520 KHz and 1710 KHz and the radio integrated circuit is configured to tune the AM channels.

10. An integrated antenna assembly, comprising:
an air loop antenna;
a transformer coupled to the air loop antenna; and
an antenna connector coupled to the transformer to provide connections to a radio device, the antenna connector being from 10 cm to 20 cm in length.

11. The integrated antenna assembly of claim 10, wherein the air loop antenna is configured to receive AM channels within an AM band between 520 KHz and 1710 KHz.

12. The integrated antenna assembly of claim 10, wherein the antenna connector comprises a shielded cable.

13. The integrated antenna assembly of claim 10, wherein the antenna connector comprises twisted pair wiring.

14. The integrated antenna assembly of claim 10, wherein the air loop antenna comprises multiple wire loops.

15. A method for receiving radio frequency (RF) signals with an integrated antenna assembly, comprising:
receiving RF signals within an air loop antenna;
sending the received RF signals to a transformer;
coupling signals from the transformer to external connections of a radio device;
receiving the signals provided to the external connections with a radio integrated circuit on a printed circuit board within the radio device; and
tuning the received signals.

16. The method of claim 15, further comprising outputting audio signals with the radio device.

17. The method of claim 15, further comprising positioning the transformer from 10 cm to 20 cm from the printed circuit board.

18. The method of claim 15, further comprising positioning the transformer from 10 cm to 20 cm from the radio device.

19. The method of claim 15, further comprising receiving AM channels within an AM band between 520 KHz and 1710 KHz using the air loop antenna and tuning the AM channels with the radio integrated circuit.

20. The method of claim 19, wherein the coupling step comprises coupling signals from the transformer to the external connections of the radio device using an antenna connector between 10 and 20 cm in length.

* * * * *